US005414235A

United States Patent [19]

Lucas et al.

[11] Patent Number: 5,414,235

[45] Date of Patent: May 9, 1995

[54] GAS PLASMA GENERATING SYSTEM WITH RESONANT CAVITY

[75] Inventors: William Lucas, Cambridge; James Lucas, Liverpool, both of England

[73] Assignee: The Welding Institute, Cambridge, United Kingdom

[21] Appl. No.: 66,083

[22] PCT Filed: Nov. 26, 1991

[86] PCT No.: PCT/GB91/02086

§ 371 Date: May 26, 1993

§ 102(e) Date: May 26, 1993

[87] PCT Pub. No.: WO92/10077

PCT Pub. Date: Jun. 11, 1992

[30] Foreign Application Priority Data

Nov. 27, 1990 [GB] United Kingdom ................. 9025695

[51] Int. Cl.[6] ................................................ B23K 10/00

[52] U.S. Cl. .......................... 219/121.43; 519/121.52; 519/121.45; 519/121.48; 519/696; 315/111.21; 219/690

[58] Field of Search ...................... 219/121.43, 121.44, 219/10.55 A, 121.52, 121.45, 121.48, 696, 690; 204/298.38, 298.08, 298.17; 156/345; 315/111.21, 111.81

[56] References Cited

U.S. PATENT DOCUMENTS

| | | | |
|---|---|---|---|
| 4,049,940 | 9/1977 | Moisan et al. | 219/10.55 R |
| 4,780,642 | 10/1988 | Jacquot | 204/425 |
| 4,883,570 | 11/1989 | Efthimion et al. | 204/164 |
| 5,021,919 | 6/1991 | Engemann | 361/225 |
| 5,225,740 | 7/1993 | Ohkawa | 315/111.41 |

FOREIGN PATENT DOCUMENTS

| | | |
|---|---|---|
| 0321792 | 6/1989 | European Pat. Off. . |
| 0388800A2 | 9/1990 | European Pat. Off. . |
| 2074715 | 10/1971 | France . |
| 2290126 | 5/1976 | France . |
| 0043740 | 1/1982 | France . |
| WO8810506 | 12/1988 | WIPO . |

OTHER PUBLICATIONS

Journal of Vacuum Science and Technology: Part B. vol. 4, No. 1, Jan. 1986, New York US pp. 295–298; Roppel et al.: 'Low temperature oxidation of silicon using a microwave plasma disk source'.

*Primary Examiner*—Mark H. Paschall
*Attorney, Agent, or Firm*—Martin Novack

[57] ABSTRACT

A gas plasma generating system includes a resonant cavity for connection to a source of very high frequency power. A plasma cavity is defined by a wall of an electrically nonconductive material positioned within the resonant cavity for containing an ionizable gas such that in use a plasma is formed in the plasma cavity, the cavity having an exit opening to enable plasma to exit from the system. The plasma cavity comprises a tubular member extending through opposed walls of the resonant cavity, the tubular member receiving at one end a plasma gas, in use, and plasma exiting from the other end, and a movable tuning member whose position can be adjusted to achieve the desired tuning condition, the tubular member defining the plasma cavity extending through the tuning member.

29 Claims, 2 Drawing Sheets

GAS PLASMA GENERATING SYSTEM WITH RESONANT CAVITY

The invention relates to a gas plasma generating system for use, for example, in a welding application.

It is known that very high frequency electric power can be transmitted via hollow conductors (commonly known as waveguides). The source of such high frequency includes a resonant cavity device such as a magnetron, klystron or free electron laser. Attempts have been made in the past to utilise this very high frequency power to create gas plasmas. In one arrangement, gas flows along a conduit across which high frequency power is passed. (High Power Microwave Plasma Beam as a Heat Source—Application to Cutting. Arata et al, Transactions of JWRI, Vol 4, No. 2 (1975) pp1–6). Although this produces a plasma, the plasma itself forms a load on the power transmission line and it is necessary to blow the gas at high rate through the conduit to extract the energy. Typical flow rates are in the range 250–400 liters/minute.

SUMMARY OF INVENTION

In accordance with the present invention, a gas plasma generating system comprises a resonant cavity for connection to a source of very high frequency power; a plasma cavity defined by an electrically non-conductive material positioned within the resonant cavity for containing an ionisable gas such that in use a plasma is formed in the plasma cavity, the cavity having an exit opening to enable plasma to exit from the system, wherein the plasma cavity comprises a tubular member extending through opposed walls of the resonant cavity, the tubular member receiving at one end a plasma gas, in use, and plasma exiting from the other end; and a movable tuning member whose position can be adjusted to achieve the desired tuning condition, the tubular member defining the plasma cavity extending through the tuning member.

High frequency discharges at random are known from power supplies operating at very high frequency, where random ionisation has occurred of the surrounding atmosphere or where there has been inadequate contact between one component and another carrying the very high frequency current. These discharges are uncontrolled and indeed are unwanted since in general they result in significant power loss in a transmission of the very high frequency current.

We have found that it is possible to harness these previously undesireable discharges so that the very high frequency power can be used to create a gas plasma.

By utilising a non-electrically conductive material to define the plasma cavity, electrical shorting across the resonant cavity is prevented since the ionising gas is restrained within the plasma cavity. Typically, the plasma cavity is confined by a ceramic wall.

The space within the resonant cavity surrounding the plasma cavity is filled with an insulating gas which is preferably air since this is particularly good for cooling.

It has been found with the invention that gas flows as low as of one liter/minute are achievable.

In this context, by very high frequency we mean generally frequencies in excess of 100 MHz and preferably in excess of 1 GHz, even in excess of 10 GHz. In this latter range, the tuned cavity dimensions are of the order of tens of millimeters while the exiting plasma can be used for heating, surface treatment, welding or cutting as are known at comparatively low frequencies or with DC in the field of welding technology.

The tuning member will typically comprise a tuning stub. In some cases an additional fine tuning member will also be provided.

The source of very high frequency power could be tunable or indeed both the source and resonant cavity could be tunable. By providing at least one tunable component it is possible to optimize both the striking and the running of the discharge. It should be noted that before the discharge is established, the resonant cavity is in effect open-circuited. During use, retuning of the source cavity is preferably carried out so that a high current flows through the plasma discharge to provide heating and ionization of the gases forming the discharge.

Any conventional source of high frequency power could be used such as a magnetron, klystron or free electron laser. The power can be supplied from the source to the resonant cavity via wave guides, coaxial lines or equivalent.

In one particular arrangement the wave guide may be a flexible wave guide with an end termination producing a standing wave forming a node at a short distance from the end where the desired discharge such as an arc is to be located. In another arrangement the cavity and wave guide may be in the form of a doughnut ring with the very high frequency generator at one position and the desired discharge at nominally a diametrically opposite position in the ring.

In the preferred embodiment, a tunable, very high frequency generator is utilised together with a suitable wide band amplifier for feeding the connecting wave guide and cavity between the generator and the cavity containing the discharge. An objective of the tunable arrangement is readily to change the effective field distribution characteristics of the wave guide or cavity with respect to the region of the discharge, so that at one stage a hypertensial (E mode) is developed and at another stage a high current (H mode) is obtained in the discharge. This transition may be controlled via a high speed digital computer or dedicated digital control system with a transducer detecting the events in the vicinity of the discharge, so that the high voltage is maintained until breakdown occurs and thereafter the high current stage is induced. Alternatively, the change-over may be pre-timed so that the high voltage is maintained for a finite period, thereafter the system reverts to the high current stage for maintaining the discharge so established.

The wave guide may be shaped to produce specific field patterns in the vicinity or desired region for the discharge in order to enhance the striking of the discharge or its maintenance after breakdown.

The plasma cavity will be supplied in use with preferably an inert gas or a substantially inert gas.

Suitable dielectrics for support members and other non-conducting components including the plasma cavity are quartz, boron nitride, alumina and machinable ceramics because of their low loss characteristics at high frequency.

The invention has a number of different applications. The high frequency electric plasma discharge itself could be used for heating, welding or cutting materials or could be used to maintain a known electric arc system for the purposes of heating, welding or cutting materials, particularly metals. This will be described in more detail below. However, it should be noted that, under suitable conditions, the introduction of the very high frequency plasma allows a low frequency discharge to be maintained with low values of alternating current without the necessity either for high circuit voltages or for the injection of restriking voltages in the region of current zero.

The high frequency may also be used to preheat the wire in MIG welding or the separate wire feed as in the TIG-hot process. In either case, heating of the wire will take place prior to it entering the arc.

An example of a gas plasma generating system according to the invention will now be described and contrasted with comparative examples with reference to the accompanying drawings, in which:

DETAILED DESCRIPTION OF DRAWINGS

Figure 1:
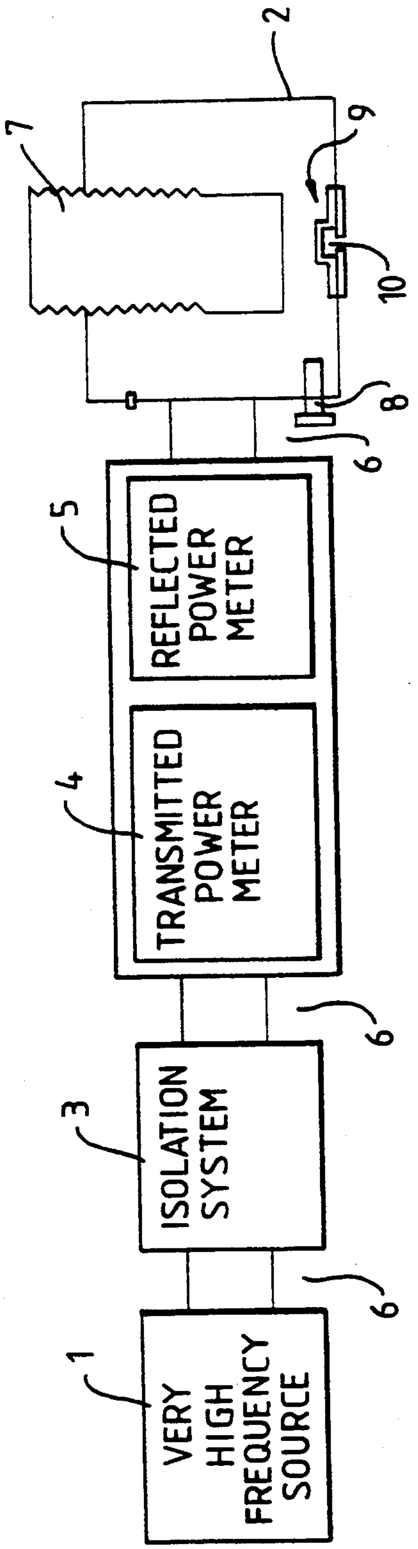
FIG. 1 is a block diagram of a complete system.

The gas plasma generating system shown in FIG. 1 comprises a very high frequency source 1 such as a magnetron or klystron coupled via wave guides or coaxial cable 6 to a resonant or tuning cavity 2. An isolation system 3 is provided between the source 1 and the cavity 2 to prevent reflected power returning to the source 1, while a transmitted power meter 4 and reflected power meter 5 are positioned between the source 1 and the isolation system 3.

The resonant cavity 2 is only shown schematically in FIG. 1. FIG. 1 illustrates the presence of a primary, coarse tuning stub 7 having an external screw thread allowing it to be adjusted inwardly and outwardly of the resonant cavity 2. A fine tuning stub 8 is also provided to enable fine tuning to be achieved. A plasma cavity 9 is positioned in the resonant cavity 2, the cavity 9 having an opening 10 positioned in alignment with a corresponding opening within the wall of the resonant cavity 2.

Figure 2:
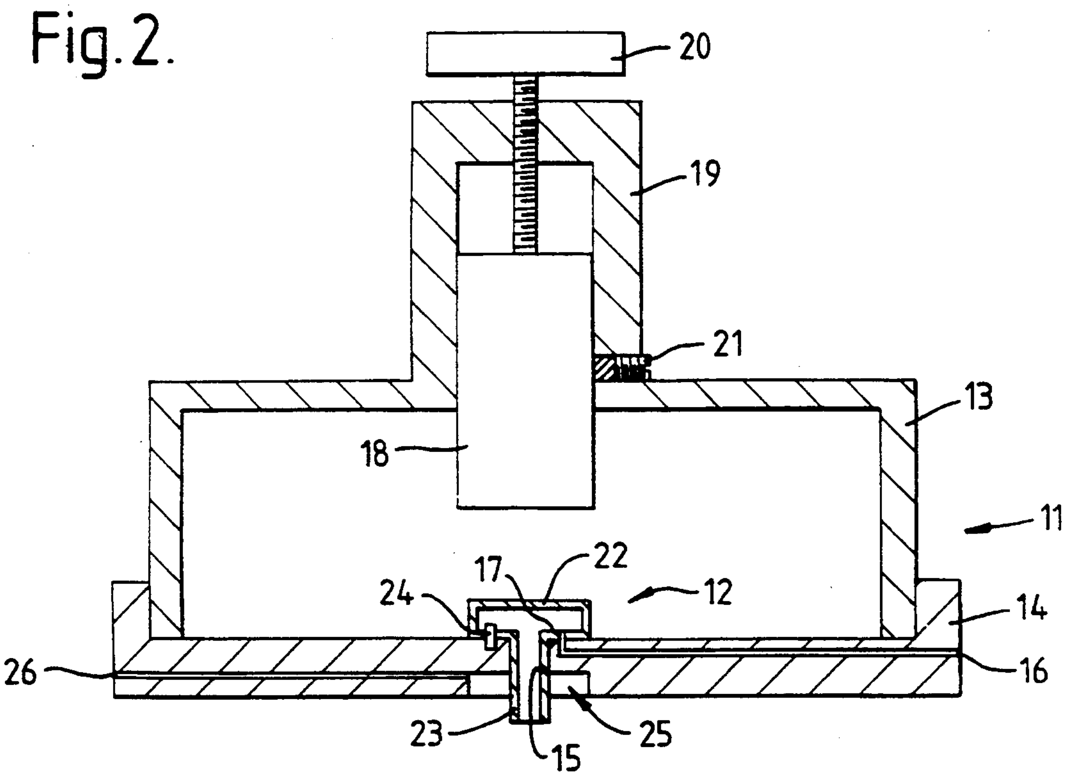
FIG. 2 illustrates an example of the resonant and plasma cavities of a comparative example; and, FIG. 3 illustrates the resonant and plasma cavities of a second example of the invention.

FIG. 2 illustrates an example of a resonant cavity 11 and plasma cavity 12 in more detail. The resonant cavity 11 has walls defined by conducting material such as brass and comprises a main body portion 13 with a generally circular cross-section. The main body portion is closed on its lower side by a plate 14 which defines a plasma exit opening 15 for the plasma cavity 12 to be described below. The plate 14 also includes a conduit 16 for the supply of gas to the plasma cavity 12 through an orifice 17. The resonant cavity 11 is tunable by means of an axially movable, cylindrical block 18 mounted in a housing 19 to the main body portion 13. The block 18 can be moved into and out of the cavity 11 by turning a screw-threaded connector 20. A sprung contact plug 21 ensures good contact between the block 18 and the housing 19.

The plasma cavity 12 which is located at the exit opening 15 of the resonant cavity 11 has a circular cross section and is defined by an upper, ceramic part 22 which is secured to a ceramic nozzle section 23. A typical dimension for the ceramic part 22 is a diameter of 7 mm and a height of 3 mm. Gas is supplied from the conduit 16 in the plate 14 to the cavity 12. Plasma exits from the cavity 12 through the nozzle section 23. A tungsten electrode 24 is mounted within the plasma cavity 12.

A separate shielding gas flow is fed to a region 25 surrounding the nozzle 23 through a conduit 26 in the plate 14. The gas is typically argon or argon-hydrogen and is used to cool the nozzle 23 and to provide protection of the weld pool and surrounding metal during welding and surface treatment or to assist in cutting.

The plasma gas supplied through the conduit 16 is preferably an inert gas with an admixture of a diatomic gas to increase the power dissipated in the discharge. For example, argon with hydrogen provides a discharge capable of heating for surface treatment or melting or cutting metals placed in the vicinity of the plasma outflow from the orifice. The hydrogen content can be substantially increased, but preferably it does not exceed 40% in order to maintain a stable running discharge. Other gases include helium for welding and nitrogen and air for cutting.

The rate at which gas is flowed through the conduit 16, must be such as to enable ionisation to be achieved but not so high that the gas is cooled. For a 200 W source 1, a flow rate of 1 liter/minute has been found to be suitable.

Figure 3:
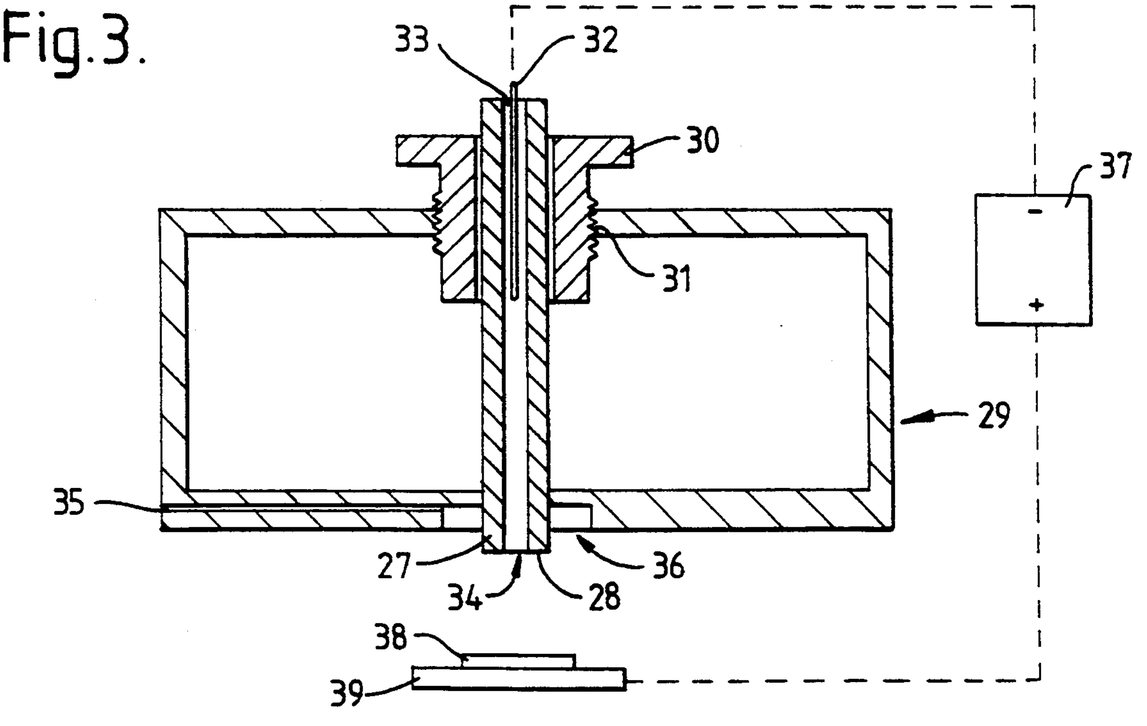

An example of the invention is shown in FIG. 3 in which a plasma cavity 27 is defined by a tubular ceramic member extending through opposed sides of a resonant cavity 29. On one side, the tubular member passes through an aperture 28 in a wall of the resonant cavity 29 while on the opposite side the tubular member passes through a tuning stub 30 screw-threaded into an aperture 31 in the resonant cavity 29. An electrode 32 extends into the tubular member 27. Plasma gas is supplied into the upper opening 33 of the tubular member 27 which, since it extends throughout the resonant cavity 29, prevents the plasma from forming a short circuit between the tuning stub 30 and the resonant cavity wall. The plasma exits through the end 34 of the ceramic tube 27. A typical bore diameter of the ceramic tube 27 is 3 mm and the gas flow is typically 1 liter/minute at 200 W power. Shielding gas is supplied, as before, through a conduit 35 to the region 36 surrounding the exit of the ceramic tube 27. The advantage of the FIG. 3 construction is that it enables a simple ceramic tube to be used both to feed the plasma gas and to form the plasma.

The power of the high frequency generator 1 may of the order 500–1000 W or higher as desired. Such high frequency generators are commonly used in the microwave industry for heating foodstuffs and the like and for curing wood and adhesives, and so forth. To enhance the power in the discharge for purposes of heat treatment, welding and cutting of materials, further electric supplies can be introduced. For example, a connection may be made to the workpiece and the probe electrode which is placed in contact with the plasma inside the cavity.

Alternatively, a separate power discharge can be arranged on the output side of the plasma outlet with, say, an electrode (eg. a Tg electrode) penetrating into the plasma stream, together with the workpiece. Power is supplied to the auxiliary electrode and workpiece to increase the intensity of the output discharge for treatment of metals, heating, welding and cutting. In a preferred arrangement the auxiliary electrode is electrically connected to the plasma cavity (input or gas output) so that it is at a similar potential. Low frequency AC or DC supplies may utilised in conjunction with the continuous high frequency discharge without substantially interferring with the operation of the latter.

A modification of this enhancement is shown in FIG. 3. A voltage source 37 is connected between the electrode 32 and a workpiece 38 carried on a support 39.

Alternatively, the high frequency power may be used to ignite an AC/DC arc, the high frequency being reduced or turned off immediately following the connection of the auxiliary power circuit. Yet again, the high frequency may be switched off just before the auxiliary circuit is connected. Interlock electromechanical means may be utilised to ensure proper sequence of operations so that the high frequency is used to initiate a discharge which is thereafter maintained by conventional DC or low frequency AC power circuits. The enhanced discharge can comprise an arc discharge from a tungsten electrode such as in TIG or plasma arc welding or it may comprise a relatively thin wire which is melted and consumed by the enhanced discharge as in MIG arc welding. The low frequency or DC current in such a discharge may be maintained at a steady level or alternatively operated in sequence at more than one level, as is known in pulsed welding current. The gases used in the enhanced discharge may be typical of those used in TIG and MIG arc welding or in plasma welding and cutting, such as inert or substantially inert gases composed of argon, helium or admixtures thereof together with limited additions of other gases such as hydrogen or oxygen, as is well known. For cutting, the gas can be either argon-$H_2$, nitrogen or air but special electrode material such as hafnium tipped copper electrode will be required. Furthermore, oxidising gas atmospheres especially for MIG welding may be used, such as $CO_2$ or admixtures of inert gas with $CO_2$ and similar mixtures with small additions of oxygen, and so forth. These gases are well known in the field of welding and cutting technology and are not a specific part of the present invention.

These and other variations can be adapted wherever feasible in association with the high frequency discharge from an unconnected probe electrode.

We claim:

1. A gas plasma generating system comprising a resonant cavity for connection to a source of very high frequency power; a plasma cavity defined by a wall of an electrically non-conductive material positioned within the resonant cavity for containing an ionisable gas such that in use a plasma is formed in the plasma cavity, the cavity having an exit opening to enable plasma to exit from the system, wherein the plasma cavity comprises a tubular member extending through opposed walls of the resonant cavity, the tubular member receiving at one end a plasma gas, in use, and plasma exiting from the other end; and a movable tuning member whose position can be adjusted to achieve the desired tuning condition, the tubular member defining the plasma cavity extending through the tuning member.

2. A system according to claim 1, wherein the plasma cavity comprises a first section positioned within the resonant cavity, and a second, nozzle section communicating with the first section and extending through an aperture in the resonant cavity.

3. A system according to claim 2, further comprising means to enable a plasma gas to be supplied to the first section of the plasma cavity.

4. A system according to claim 3, wherein the means includes a conduit extending through a wall of the resonant cavity.

5. A system according to claim 1, wherein the plasma cavity is defined by a ceramic wall.

6. A system according to claim 1, further comprising means for supplying a shielding gas to a region surrounding an exit portion of the plasma cavity.

7. A system according to claim 6, wherein the means includes a conduit extending through a wall of the resonant cavity.

8. A system according to claim 2, wherein the plasma cavity is defined by a ceramic wall.

9. A system according to claim 3, wherein the plasma cavity is defined by a ceramic wall.

10. A system according to claim 2, further comprising means for supplying a shielding gas to a region surrounding an exit portion of the plasma cavity.

11. A system according to claim 3, further comprising means for supplying a shielding gas to a region surrounding an exit portion of the plasma cavity.

12. A system according to claim 4, further comprising means for supplying a shielding gas to a region surrounding an exit portion of the plasma cavity.

13. A system according to claim 5, further comprising means for supplying a shielding gas to a region surrounding an exit portion of the plasma cavity.

14. A system according to claim 1, wherein a part of said one of said opposed walls of said resonant cavity nearer said other end of said tubular member is of reduced thickness relative to the remainder of said wall.

15. A system according to claim 1, wherein said movable tuning member is movably mounted to the one of said opposed walls of said resonant cavity nearer to said one end of said tubular member.

16. A system according to claim 1, further comprising an electrode extending into said tubular member.

17. A system according to claim 16, wherein said electrode extends through the part of said tubular member surrounded by said movable tuning member.

18. A welding apparatus comprising a gas plasma generating system that includes: a resonant cavity for connection to a source of very high frequency power; a plasma cavity defined by a wall of an electrically non-conducting material positioned within the resonant cavity for containing an ionizable gas such that in use a plasma is formed in the plasma cavity, the cavity having an exit opening to enable plasma to exit from the system, wherein the plasma cavity comprises a tubular member extending through opposed walls of the resonant cavity, the tubular member receiving at one end a plasma gas, in use, and plasma exiting from the other end; and a movable tuning member whose position can be adjusted to achieve the desired tuning condition, the tubular member defining the plasma cavity extending through the tuning member.

19. Welding apparatus according to claim 18, further comprising an electrode positioned in use in the plasma; and means for generating a voltage between the electrode and a workpiece.

20. Welding apparatus according to claim 18, wherein the plasma cavity comprises a first section positioned within the resonant cavity, and a second, nozzle section communicating with the first section and extending through an aperture in the resonant cavity.

21. Welding apparatus according to claim 20, further comprising means to enable a plasma gas to be supplied to the first section of the plasma cavity.

22. Welding apparatus according to claim 21, wherein the means includes a conduit extending through a wall of the resonant cavity.

23. Welding apparatus according to claim 18, wherein the plasma cavity is defined by a ceramic wall.

24. Welding apparatus according to claim 18, further comprising means for supplying a shielding gas to a region surrounding an exit portion of the plasma cavity.

25. Welding apparatus according to claim 24, wherein the means includes a conduit extending through a wall of the resonant cavity.

26. A system according to claim 24, wherein a part of said one of said opposed walls of said resonant cavity nearer said other end of said tubular member is of reduced thickness relative to the remainder of said wall.

27. A system according to claim 18, wherein said movable tuning member is movably mounted to the one of said opposed walls of said resonant cavity nearer to said one end of said tubular member.

28. A system according to claim 18, further comprising an electrode extending into said tubular member.

29. A system according to claim 28, wherein said electrode extends through the part of said tubular member surrounded by said movable member.

* * * * *